No. 707,714. Patented Aug. 26, 1902.
T. W. OTTO.
KEYBOARD MACHINE.
(Application filed Oct. 23, 1901.)
(No Model.) 6 Sheets—Sheet 5.

WITNESSES
F. A. Stewart
F. F. Teller

INVENTOR
Theodore W. Otto
BY
Edgar Tate
ATTORNEYS

UNITED STATES PATENT OFFICE.

THEODORE WILLIAM OTTO, OF STAMFORD, CONNECTICUT.

KEYBOARD-MACHINE.

SPECIFICATION forming part of Letters Patent No. 707,714, dated August 26, 1902.

Application filed October 23, 1901. Serial No. 79,675. (No model.)

*To all whom it may concern:*

Be it known that I, THEODORE WILLIAM OTTO, a citizen of the United States, residing at Stamford, in the county of Fairfield and State of Connecticut, have invented certain new and useful Improvements in Keyboard-Machines, of which the following is a full and complete specification, such as will enable those skilled in the art to which it appertains to make and use the same.

This invention relates to keyboard-machines and instruments, such as type-writing machines, cash-registers, pianos, organs, and other machines and instruments of this class; and the object thereof is to provide such machines or instruments with means for automatically depressing a key or keys to the desired extent after the initial depression has been given by hand in the usual manner, whereby the operation of the machine or instrument will be made less laborious and more rapid, a further object being to provide means for locking all the keys except the ones that are struck and which it is desired to operate and also to provide a machine or instrument of the class described which may when desired be operated entirely by hand in the usual manner; and with these and other objects in view the invention consists in a machine or instrument of the class or classes referred to provided with means or devices for depressing a key or keys and also for locking such keys as are not struck, said means or devices being constructed as hereinafter described and claimed.

In the drawings forming part of this specification I have shown my invention applied to an ordinary type-writing machine, and in the drawings in which the separate parts of my improvement are designated by the same reference characters in each of the views, Fig. 5, a sectional side view of a detail of the construction which I employ and showing one of the keys and the support thereof, together with the outer end of one of the key-bars; Fig. 6, a longitudinal sectional view of another detail of the construction, showing one of the two solenoids which I employ; Fig. 7, a plan view of a transverse plate forming a part of the keyboard mechanism; Figs. 8 and 9, similar views of another plate forming part of said mechanism; Fig. $9^a$, a view similar to Figs. 7, 8, and 9 of another keyboard-plate; Fig. 10, a front edge view of the plate shown in Fig. 9 and showing one of the end connections therefor; Fig. 11, a sectional plan view of the opposite sides of the machine and showing a part of my improved mechanism connected therewith.

In the drawings forming part of this specification I have only shown such parts of a type-writing machine as are necessary to illustrate the construction and operation of my improvement, and in said drawings the frame of the machine comprises a base portion composed of a hollow transverse back member $a$, a left-hand side plate $a^2$, a right-hand side plate $a^3$, a transverse front plate $a^4$, together with a transverse bar $a^5$, arranged rearwardly of the keyboard, and vertical side or corner posts $a^6$, which support the annular top plate $a^7$ and the other parts of the machine connected therewith, all of these parts being of the usual form and construction.

Figures 5, 6, 7, 8, 9, 9A, 10:
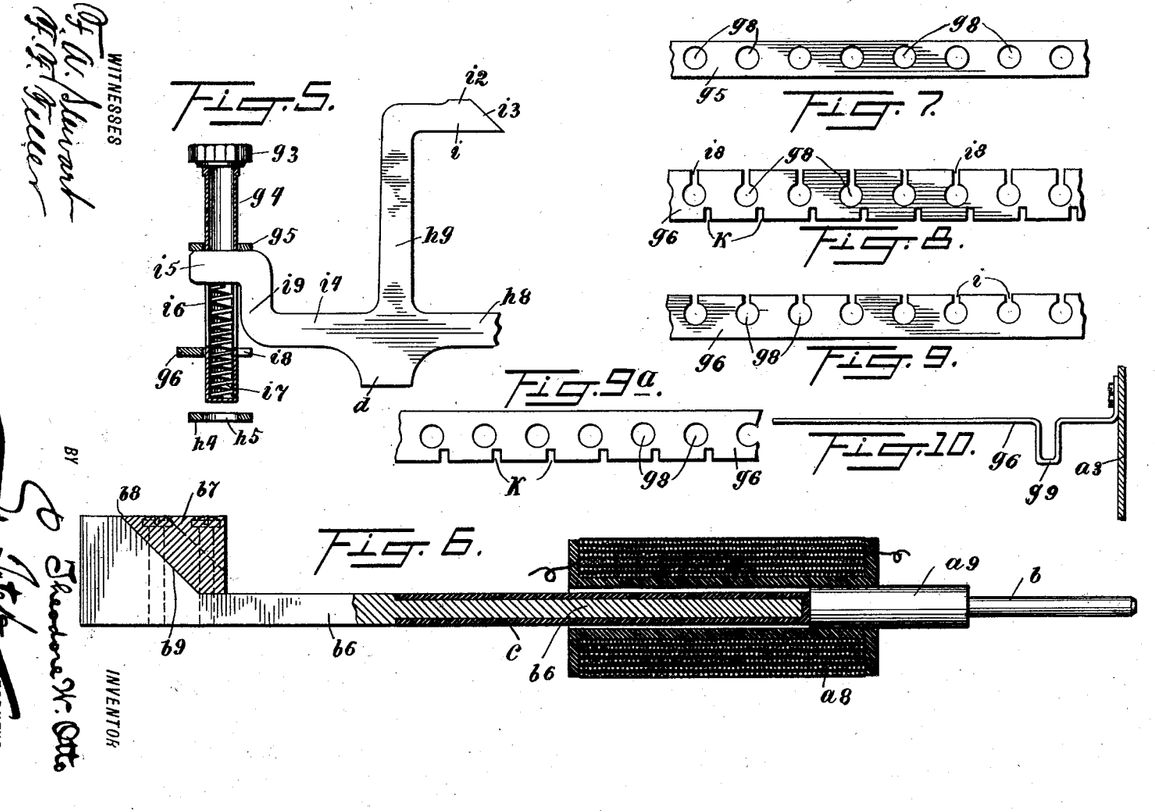

In the practice of my invention I secure to the inner side of each of the side plates $a^2$ and $a^3$ of the frame of the machine a solenoid $a^8$, one of which is shown in longitudinal section in Fig. 6, and these solenoids are each provided in the rear end thereof with a longitudinally-movable plunger $a^9$, each of which is provided with a stem $b$, which passes through a suitable support or guide $b^2$, said supports or guides being secured to the rear upright posts $a^6$ of the frame of the machine, and the stems $b$ of the plungers $a^9$ are insulated from the supports $b^2$, as shown at $b^3$.

Figure 1:
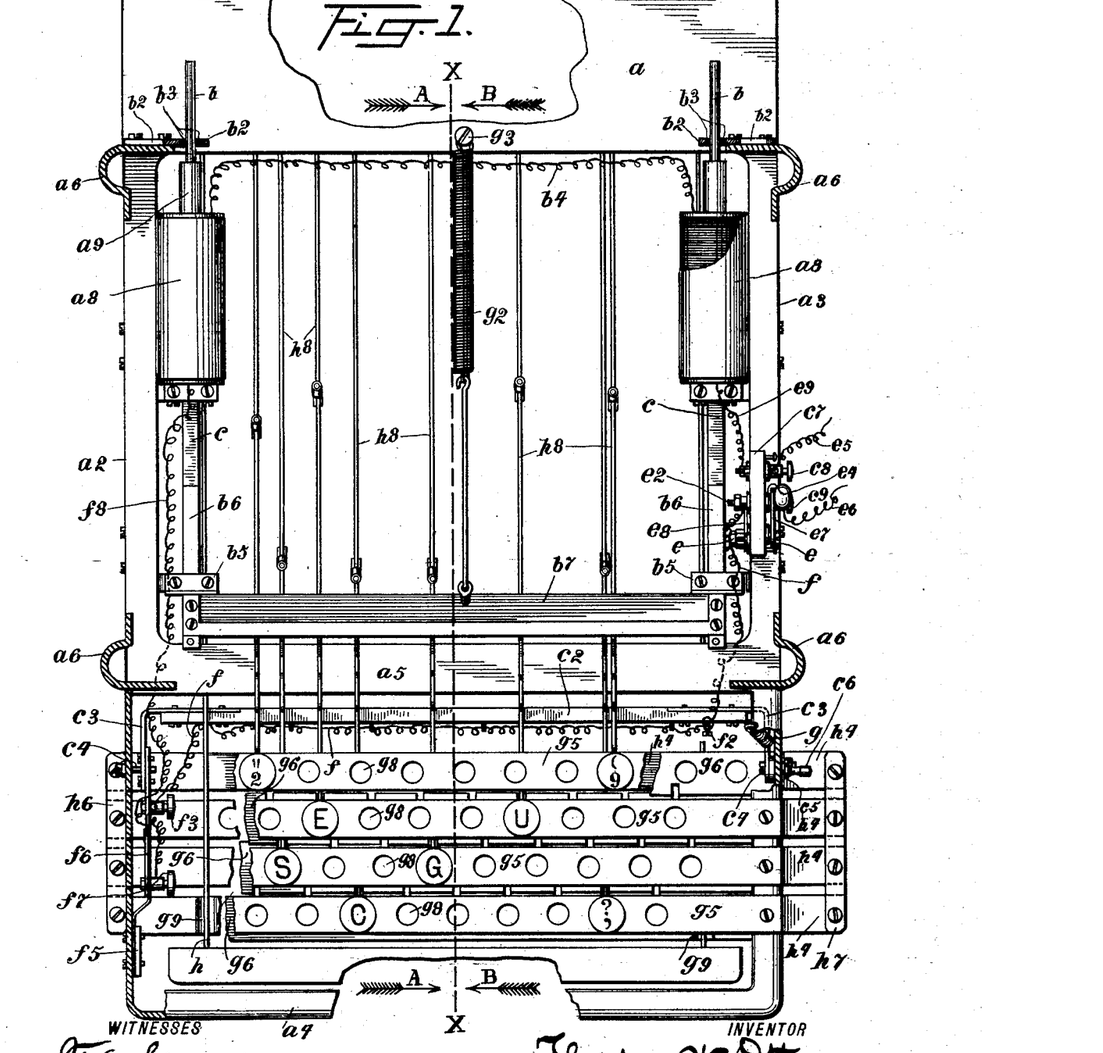
Figure 1 is a plan view of the base portion of a type-writing machine, the top portion of the machine being removed and part of the construction being shown in section.

The solenoids $a^8$ are placed in connection at their rear ends by a wire $b^4$, and secured to the inner sides of the separate side pieces $a^2$ and $a^3$ of the frame of the machine are guides or keepers $b^5$, in which are mounted slide-bars $b^6$, which are connected at their forward ends by a transverse bar $b^7$, which is provided with a forwardly-directed edge $b^8$ at the top thereof, the bottom of said bar being inclined downwardly and backwardly, as shown at $b^9$, this construction being clearly shown in Fig. 6, and the slide-bars $b^6$ and the cross-bar $b^7$, connected therewith, being shown in plan in Fig. 1. The rear ends of the slide-bars $b^6$ enter the solenoids $a^8$, and said slide-bars are composed of metal, and that part thereof which enters and moves in the solenoids is provided with an insulating sleeve or covering $c$, as is also clearly shown in Fig. 6.

Mounted between the front portions of the side plates $a^2$ and $a^3$ and under the rear row of keys is a transverse yoke-shaped device consisting of a bar $c^2$, having forwardly-directed end members $c^3$, which are pivoted beneath and in line with the rear row of keys, as shown at $c^4$, and at the right-hand side of the machine the pivot-pin at $c^4$ passes through the frame-plate $a^3$ and is provided with a crank $c^5$, having a handle $c^6$, and by turning the crank $c^5$ forwardly the bar $c^2$ will be raised, and by turning said crank backwardly the bar $c^2$ will be lowered, as will be readily understood.

Secured to the right-hand frame-plate $a^3$ midway between the right-hand solenoid $a^8$ and the front upright or post $a^6$ is a rheostat consisting of a plate $g^7$, having three binding-posts $c^8$, $c^9$, and $e$ at the bottom thereof, and said plate is also provided in the top thereof with a central binding-post $e^2$ and at the opposite sides thereof with stops $e^3$, the stops $e^3$ being on the outer side of said plate and the binding-post $e^2$ being on the inner side thereof, and said binding-post is provided at the outer end thereof outside of the said plate with a contact knob or button $e^4$. Connected with the outer ends of the binding-posts $c^8$ and $c^9$ at the bottom of the plate $c^7$ are circuit-wires $e^5$ and $e^6$, and mounted on the outer end of the post $e$ at the bottom of the plate $c^7$ is a switch-lever $e^7$, and the inner ends of the posts $e^2$ and $e$ are connected by a plate $e^8$.

A wire $e^9$ connects the right-hand solenoid $a^8$ with the inner end of the binding-post $c^8$, and another wire $f$ is connected with the inner end of the binding-post $e^2$ at the top of the plate $c^7$ and extends forwardly and is connected with the vertically-movable transverse bar $c^2$ at $f^2$, and this wire is carried along the bar $c^2$ transversely of the keyboard and is connected with a binding-post $f^3$, secured to a contact-plate $f^4$, secured to the forwardly-directed member $c^3$ of the bar $c^2$ at the left-hand end of said bar, this connection between the contact-plate $f^4$ and the forwardly-directed member $c^3$ of the bar $c^2$ being made at the pivotal support $c^4$ of said bar on the left-hand side of the machine, and as thus constructed it will be seen that the contact-plate $f^4$ swings vertically with the bar $c^2$.

Figures 11, 15:
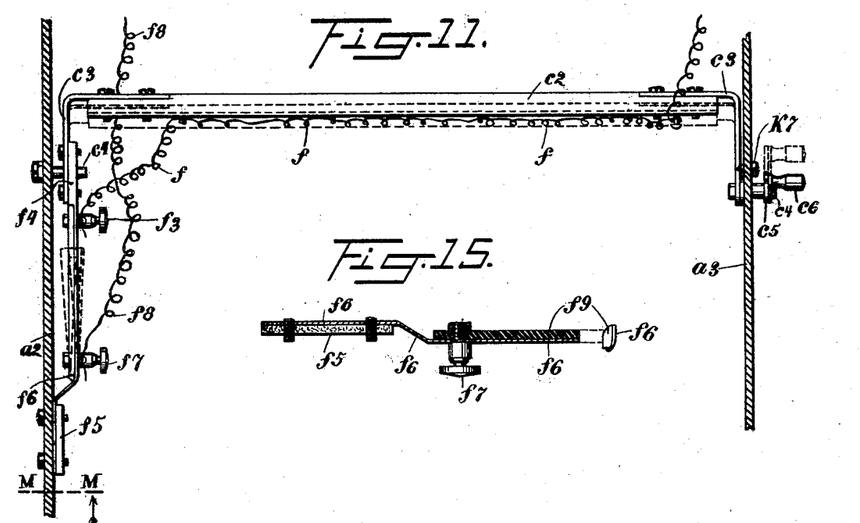
Figure 12:
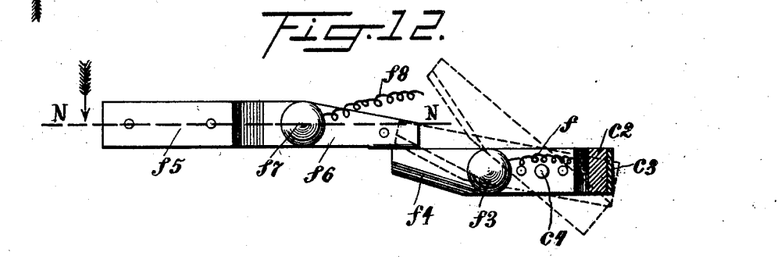
Fig. 12, an inside view of a switch device which in practice is connected with the inside of the left-hand side of the base portion of the machine.
Figure 13:
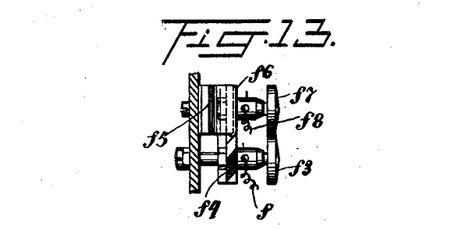
Fig. 13, a section on the line M M of Fig. 11.

Secured to the inside of the left-hand frame-plate $a^2$ at $f^5$ is a spring contact-plate $f^6$, which is provided with a binding-post $f^7$, and a wire $f^8$ connects the left-hand solenoid $a^8$ with the binding-post $f^7$. The inner or rear side of the spring contact-plate $f^6$, in connection with which the outer or front end of the contact-plate $f^4$ operates, is insulated at $f^9$, as shown in Fig. 15, and the outer end of the contact-plate $f^4$ is beveled, as shown in Fig. 13, the upper edge thereof being beveled on its outer side and the lower edge thereof being beveled on its inner side, and as the outer or front end of the contact-plate $f^4$ moves upwardly it passes on the outer side of the inner end of the contact-plate $f^6$ and the electrical circuit is broken; but as the outer end of the contact-plate $f^4$ moves downwardly it passes on the inner side of the inner end of the contact-plate $f^6$, and electrical connection is made.

Secured to the vertically-movable bar $c^2$, preferably at the right-hand end thereof, is a spring $g$, which is also secured to the right-hand frame-plate $a^3$, the object of this spring being to automatically raise the bar $c^2$ after it has been depressed, said bar being depressed in the operation of the machine, as hereinafter described, by the key-bars each time that one of the keys is operated, this being the operation when the electrical apparatus is in operation; but when the electrical apparatus is not in operation the machine may be operated, as hereinafter described, entirely by hand and in the usual manner, in which event the transverse bar $c^2$ is permanently depressed and does not operate at all.

Connected centrally with the transverse bar $b^7$, which is connected with the slide-bars $b^6$, is a spring $g^2$, which is secured at its rear end to the rear member $a$ of the base of the frame of the machine, as shown at $g^3$, and the spring $g^2$ operates to move the bar $b^7$ and the slide-bars $b^6$ backwardly in the operation of the machine, as hereinafter described, the forward movement of the bar $b^7$ and the slide $b^6$ being accomplished by the operation of the solenoids $a^8$.

In this invention the keys are all supported by tubes $g^4$, with which they are connected, and the tubes $g^4$ on each row of keys pass through and are loosely movable in two transverse vertically-arranged and stationary plates $g^5$ and $g^6$. The top plates $g^5$ of the separate rows of key-tubes are all of the same form and construction, and one of the said plates is shown in Fig. 7. The plates $g^6$ of the second and third rows of keys and key-tubes are of the same form and construction, and one of said plates is shown in Fig. 8.

The plate $g^6$ of the front row of keys and key-tubes is shown in Fig. 9, while the plate $g^6$ of the rear row of keys and key-tubes is shown in Fig. 9ª.

The transverse plates $g^5$ and $g^6$ are rigidly secured to the front portions of the side plates $a^2$ and $a^3$ of the frame of the machine and are all provided with circular openings $g^8$, through which the tubes $g^4$ pass, and the plate $g^6$ of the front row of keys and key-tubes is provided near its opposite ends with downwardly-directed loops $g^9$, adapted to receive the side bars $h$ of the space-bar $h^2$ and by which said space-bar is supported.

Figure 2:
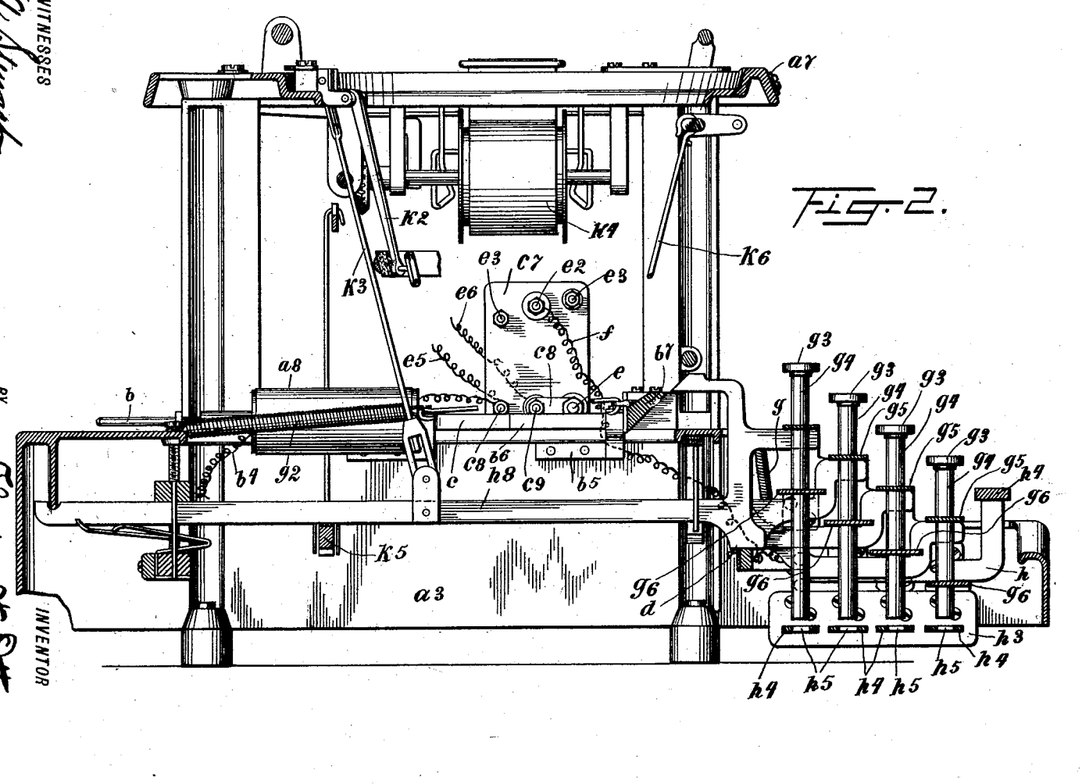
Fig. 2, a longitudinal section on the line $x\,x$ of Fig. 1 looking in the direction of the arrow A.

Secured to the inner side of the opposite side plates $a^2$ and $a^3$ of the machine are hangers or supports $h^3$, in which are loosely mounted four plates $h^4$, and these plates $h^4$ are movable longitudinally and are provided with circular openings $h^5$, similar to the openings $g^8$ in the plates $g^5$ and $g^6$, and the key-tubes in the operation of the machine are adapted under certain conditions to pass through these openings; but in the normal position of the key-tubes they are held at a short and predetermined distance above the plates $h^4$, as shown in Fig. 2. The plates $h^4$ are connected at the left-hand ends by a transverse plate $h^6$ and at the right-hand ends by a transverse plate $h^7$, and the said plates may be jointly moved longitudinally a short distance by catching hold of the right-hand ends thereof, as will be readily understood. Each of the key-bars $h^8$ is provided near its front end with an upwardly-directed member $h^9$, having a backwardly-directed arm $i$, provided with a head $i^2$, the upper surface of which is inclined downwardly and backwardly, as shown at $i^3$, and the members $i^2$ of the backwardly-directed arms $i$ of the upwardly-directed members $h^9$ of the key-bars $h^8$ are all normally held in a transverse row between the upright members or posts $a^6$ at the front of the machine. Each key-bar $h^8$ is also provided with a forwardly-directed member $i^4$, having an upwardly and forwardly directed arm $i^5$, and these arms pass through slots $i^6$ in the corresponding key-tubes $g^4$, as clearly shown in Fig. 5, and the arms $i^5$ of the key-bars are held between the plates $g^5$ and $g^6$ of all the rows of keys, and each of the tubes $g^4$ is provided with a spring $i^7$, which is placed in the lower end thereof, and these springs normally serve to hold the key-bars in their uppermost position. The plates $g^6$ of the second and third rows of key-tubes are each provided in their front edges with slots $i^8$, which communicate with the openings $g^8$, and said plates are also provided in their rear edges with slots $k$, which are not in transverse line with the slots $i^8$, and the plate $g^5$ of the front row of key-tubes is also provided on its front edge with slots $i^8$, while the plate $g^6$ of the rear row of key-tubes is provided in its rear edge with slots $k$, similar to those in the plates $g^6$ of the second and third rows of key-tubes, and these slots $i^8$ and $k$ in the plates $g^6$ are designed to permit of the movement of the upwardly-directed portions of the arms $i^9$ of the key-bars $h^8$.

The bars $g^5$ and $g^6$, through which the key-tubes pass, form guides for said tubes and hold the key-bars $h^8$ in perfect alinement at all times and prevent lateral movement of said key-bars, and with the exception of the parts herein shown and described as forming part of my improvement it will be understood that all the rest of the operating mechanism of the machine is the same as is now employed in all standard type-writers, and the said other parts of the machine for this reason are not herein shown and described in detail; but in Fig. 2 I have shown one of the type-arms at $k^2$ and the rod $k^3$, which connects the said type-arm with the corresponding key-bar $h^8$, and in this figure I have also shown at $k^4$ the ribbon-support, at $k^5$ a part of the mechanism which operates in connection with the space-bar, and at $k^6$ one of the rods which in practice is connected with the shift-key, said shift-key being not shown.

Figure 14:
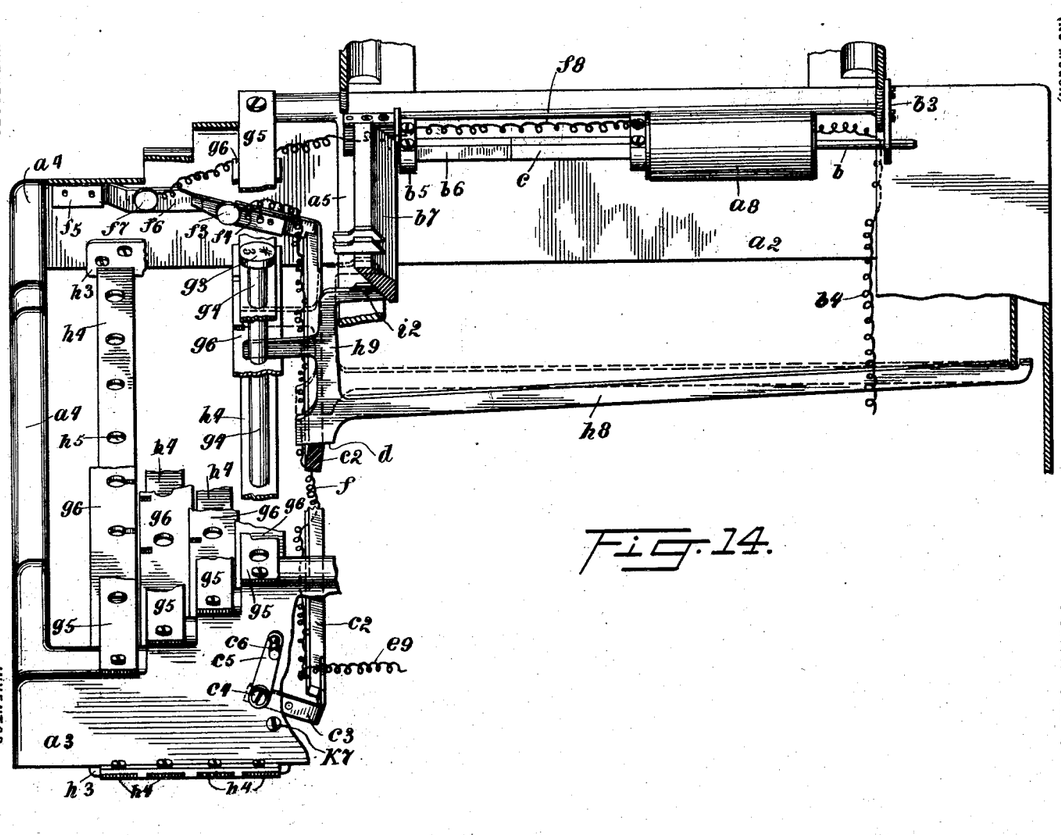
Fig. 14, a perspective view of a part of the machine and parts of the improved apparatus which I employ, and Fig. 15 a section on the line N N of Fig. 12.

As hereinbefore stated, a machine provided with my improvement may be operated entirely by hand in the usual manner, and in order to do this all that is necessary is to move the crank $c^5$ backwardly. This operation depresses the bar $c^2$, and the right-hand end member $c^3$ thereof will engage with the catch-screw $k^7$ or any other suitable device secured in the right-hand side plate $a^3$ of the frame and holding the bar $c^2$ in a depressed position, and in this position of said bar the circuit is incomplete and the keys may be operated by the fingers in the usual manner. In this operation the plates $h^4$ beneath the separate rows of key-tubes are so adjusted that the said key-tubes pass freely through the openings $h^5$ therein, and the key-tubes are depressed to the full extent by the fingers in the usual manner. Whenever it is desired to employ the electrical apparatus herein shown and described for depressing the keys, the key-tubes, and key-bars, the crank $c^5$ is pulled forwardly, so as to disengage the right-hand end members $c^3$ from the catch $k^7$, and the spring $g^2$ at once throws the bar $c^2$ up against the bottom of all the key-bars $h^8$, where it is normally held by said spring. The plates $h^4$ beneath the separate rows of key-tubes are also adjusted so that the key-tubes will not pass through the openings $h^5$ therein, but will strike on said plates the instant that said tubes have been given a slight depression by hand. If one of the keys be now struck by the finger very slightly, so as to depress the corresponding key-bar to a slight extent, or, in other words, if said key-bar be given an initial downward movement, the bar $c^2$ is also depressed at the same instant, and the key-tube strikes the corresponding plate $h^4$, and the depression of the bar $c^2$ throws up the forward end of the contact-plate $f^4$, and electrical connection is made with the contact-plate $f^6$, and this operation completes the circuit through the solenoids $a^8$, the plungers $a^9$ are drawn inwardly, and the slide-bars $b^6$ are forced forwardly and with them the transverse bar $b^7$. As the bar $b^7$ moves forwardly the front edge thereof strikes the head $i^2$ of the arm $i$ of the upwardly-directed member $h^9$ of the key-bar $h^8$, which is operated by the depressed key, and this operation forces the said key-bar downwardly to the desired extent and at the same time locks all the other key-bars against downward movement, the said bar $b^7$ moving beneath the arms $i$ of the other key-bars, as clearly shown in Fig. 14, and this locking of the key-bars which are not given an initial movement against the depression or downward movement is one of the important features of this invention, as it prevents any of the key-bars which are not struck by the hand or given an initial movement being operated. In this downward movement of the key bar or bars the springs $i^7$ in the tubes $g^4$ are depressed, and on the release of the said bars they are instantly thrown upwardly by the said springs. It will be understood that the making and breaking of the contact between the contact-plates $f^4$ and $f^6$ is instantaneous, and as the said contact is broken the bar $b^7$ is drawn backwardly by the spring $g^2$, and this backward-and-forward movement of the bar $b^7$ may be made as rapidly as it is possible to strike the keys. From this construction it will be seen that when the electrical apparatus is in operation all the necessary movement or depression of the keys and key-bars, except the initial or starting thereof, is occasioned by the bar $b^7$, and only a slight stroke with the hand is necessary in order to depress the keys or key-bars to the desired extent.

My improved apparatus is simple in construction and operation and perfectly adapted to accomplish the result for which it is intended, and by means thereof a keyboard-machine of any kind or class may be operated with far less physical exertion and more rapidity than is possible with such machines as usually constructed.

Figures 3, 4:
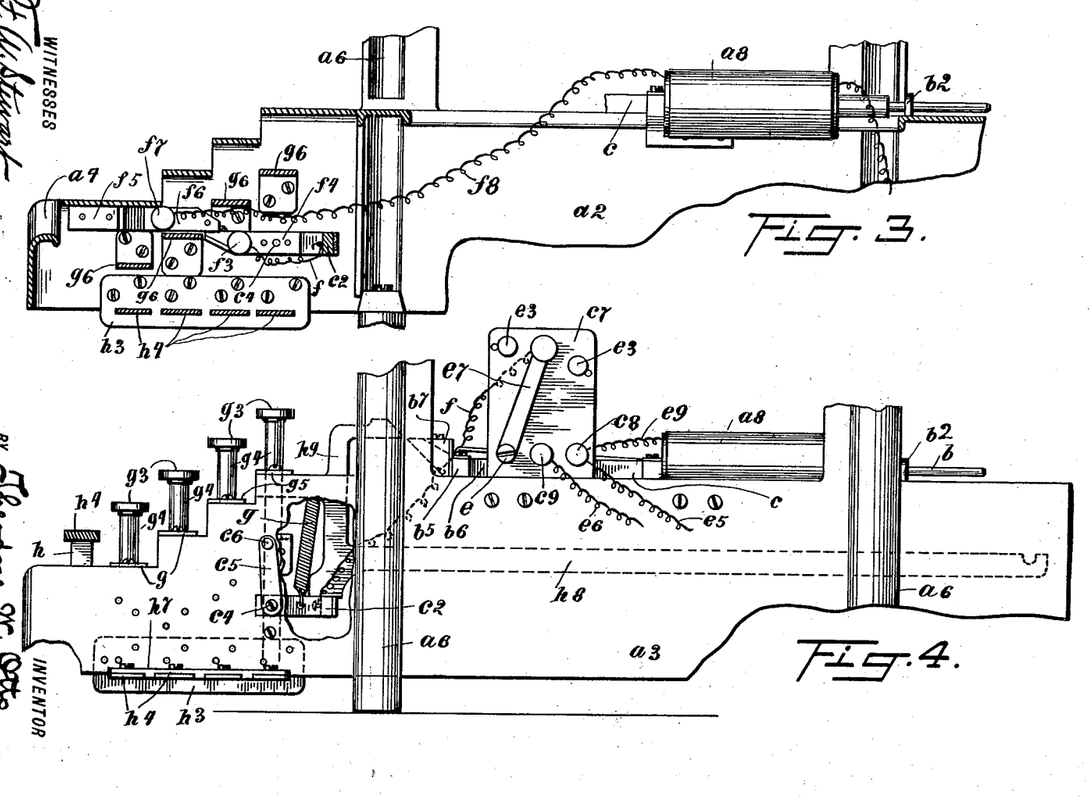
Fig. 3, a partial section on the line $x\,x$ of Fig. 1 looking in the direction of the arrow B.
Fig. 4, an outside view of the right-hand side of the machine, part of the construction being shown in section.

In practice the circuit-wires $e^5$ and $e^6$ are connected with any suitable source of electrical supply or generator, and for this purpose an ordinary battery may be employed, and when the switch-lever $e^7$ is in the position shown in Fig. 4 the current is turned on, and by moving said switch-lever in either direction or against either of the stops $e^3$ the current will be turned off. It will also be apparent that many changes in and modifications of the construction herein described may be made without departing from the spirit of my invention or sacrificing its advantages, and I reserve the right to make all such alterations therein as fairly come within the scope of my invention.

Having thus fully described my invention, what I claim as new, and desire to secure by Letters Patent, is—

1. A keyboard-machine provided with depressible keys and key-bars, a member mounted transversely of the machine rearwardly of the keyboard, electrical devices for moving said member forwardly when one or more of the keys are given an initial downward movement, devices connected with the key-bars and operated upon by said member for completing the downward movement of the key or keys and means for moving said member backwardly, substantially as shown and described.

2. A keyboard-machine provided with key-bars and keys, a key-bar locking and depressing device mounted rearwardly of the keyboard and transversely of the machine and movable forwardly and backwardly, electrical devices for moving said first-named device forwardly and for depressing such key-bars as have been given an initial downward movement and for locking the others, and means for moving said first-named device backwardly, substantially as shown and described.

3. A keyboard-machine provided with depressible key-bars and keys, a forwardly and backwardly key-bar depressing and locking device mounted transversely of the machine rearwardly of the keyboard and adapted to depress the key-bars after they have been given an initial downward movement and lock those which have not been given an initial downward movement, said device being in an electric open circuit which is closed by an initial downward movement of the key bar or bars at which time said device is drawn forwardly and means for moving said device backwardly, substantially as shown and described.

4. A keyboard-machine provided with depressible key-bars and keys, a forwardly and backwardly key-bar depressing and locking device mounted rearwardly of the keyboard and transversely of the machine, electrical devices for moving said first-named device forwardly when a key-bar has been given an initial downward movement and means for moving said device backwardly, substantially as shown and described.

5. A keyboard-machine provided with depressible key-bars and keys, an electrically-operated device for completing the depression of one of the key-bars after it has been given an initial downward movement and means whereby the said device locks all the key-bars which are not given an initial downward movement, substantially as shown and described.

6. A keyboard-machine provided with depressible key-bars and keys, a key-bar depressing and locking device mounted transversely of the machine and rearwardly of the keyboard and movable forwardly and backwardly, said device being in an open electric circuit which is closed by an initial movement given to one or more of the key-bars and by which said device is drawn forwardly, and means for moving said device backwardly, said key-bars being also provided with devices operating in connection with said first-named device whereby the forward movement of said first-named device depresses the key-bars that have been given an initial movement and locks the remainder thereof, substantially as shown and described.

7. A keyboard-machine provided with depressible key-bars and keys, solenoids mounted at the opposite sides of the rear portion of the machine and provided in their rear ends with longitudinally-movable plungers, bars passing into the front ends of the said solenoids and connected by a transverse key-bar, depressing and locking device, a transverse bar pivoted beneath the rear portion of the keyboard and normally held against the bottom of the key-bars, contact devices at one side of the keyboard, one of which is connected with said pivot-bar, said contact devices being in electrical connection with said solenoids, and means whereby the key-bar depressing and locking device operates to complete the depression of one of said bars after it has been given an initial downward movement and to lock the other bars, substantially as shown and described.

8. A keyboard-machine provided with depressible key-bars and keys, solenoids mounted at the opposite sides of the rear portion of the frame of the machine and provided at their rear ends with plungers $a^9$, slide-bars $b^6$ mounted in the front ends of said solenoids and connected by a cross-bar $b^7$, a vertically-movable transverse bar $c^2$ mounted beneath the rear portion of the keyboard and provided with forwardly-directed members $c^3$ which are pivoted to the opposite sides of the frame of the machine, means for holding said bar $c^2$ in the raised position against the bottom of the key-bars, electrical contact devices at one side of the keyboard, one of which is connected with said bar $c^2$ said contact devices being also in electrical connection with said solenoids, and said solenoids being in electrical connection, and a switch device placed at one side of the machine and in a circuit formed by the solenoids, the connecting-wires and said contact devices, said switch device being provided with circuit-wires, substantially as shown and described.

9. A keyboard-machine provided with depressible key-bars and keys, a forwardly and backwardly movable device mounted rearwardly of the keyboard, devices whereby the forward movement of the said first-named device depresses a key-bar after it has been given an initial downward movement and locks all the other key-bars, said device being mounted in an open electrical circuit the closing of which moves said device forwardly, means whereby the depression of a key opens and closes said circuit and means for moving said device backwardly, substantially as shown and described.

10. A keyboard-machine provided with depressible key-bars and key-tubes by which the keys are supported, stationary transverse plates in which said tubes are mounted and vertically movable, movable plates mounted beneath said tubes and provided with openings adapted to receive the same, said tubes being provided with springs in the lower ends thereof and with slots and said key-bars being provided with members which pass through said slots between said stationary plates, substantially as shown and described.

11. A keyboard-machine provided with depressible key-bars and key-tubes by which the keys are supported, stationary transverse plates in which said tubes are mounted and vertically movable, movable plates mounted beneath said tubes and provided with openings adapted to receive the same, said tubes being provided with springs in the lower ends thereof and with slots and said key-bars being provided with members which pass through said slots between said stationary plates, and devices whereby said key-bars are automatically depressed to the desired extent after they have been given an initial downward movement, substantially as shown and described.

12. A keyboard-machine provided with depressible key-bars and key-tubes by which the keys are supported, stationary transverse plates in which said tubes are mounted and vertically movable, movable plates mounted beneath said tubes and provided with openings adapted to receive the same, said tubes being provided with springs in the lower ends thereof and with slots and said key-bars being provided with members which pass through said slots between said stationary plates, and devices whereby said key-bars are automatically depressed to the desired extent after they have been given an initial downward movement, the key-bars which have not been given an initial downward movement being at the same time locked by said devices, substantially as shown and described.

13. A keyboard-machine provided with the usual key-bars, vertically-arranged tubes forming key-supports, said tubes being arranged in rows, transversely-arranged plates through which said tubes pass and in which said tubes are free to move, movable plates mounted beneath said tubes, and provided with openings adapted to receive said tubes, said key-bars being provided with members which pass through slots formed in said tubes and springs placed in said tubes and upon which said members bear, substantially as shown and described.

14. A machine of the class described provided with a plurality of key-bars and vertically-movable key-tubes, said tubes being slotted and adapted to receive members connected with said bars, movable plates mounted beneath said key-tubes and provided with openings adapted to receive the same and devices adapted to depress said key-bars to the desired extent after they have been given an initial downward movement, substantially as shown and described.

15. A keyboard-machine provided with key-supporting tubes which are vertically movable, stationary transverse plates through which said tubes pass, movable plates mounted below said tubes and provided with openings adapted to receive the same, and means whereby the key-bars, after they have been given an initial downward movement, are automatically depressed to the desired extent, substantially as shown and described.

16. A keyboard-machine provided with key-supporting tubes which are vertically movable, stationary transverse plates through which said tubes pass, movable plates mounted below said tubes and provided with openings adapted to receive the same, and means whereby the key-bars, after they have been given an initial downward movement, are automatically depressed to the desired extent, said devices also serving to lock the key-bars which are not depressed, substantially as shown and described.

In testimony that I claim the foregoing as my invention I have signed my name, in presence of the subscribing witnesses, this 12th day of October, 1901.

THEODORE WILLIAM OTTO.

Witnesses:
JOSIAH BRADLEY,
MAX J. OTTO.